United States Patent
Naruse

(10) Patent No.: US 10,823,372 B2
(45) Date of Patent: Nov. 3, 2020

(54) POLARIZATION PLATE, DISPLAY DEVICE, AND SWITCH DEVICE

(71) Applicant: KABUSHIKI KAISHA TOKAI RIKA DENKI SEISAKUSHO, Aichi (JP)

(72) Inventor: Mitsuru Naruse, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 16/500,554

(22) PCT Filed: Mar. 29, 2018

(86) PCT No.: PCT/JP2018/013213
§ 371 (c)(1),
(2) Date: Oct. 3, 2019

(87) PCT Pub. No.: WO2018/190142
PCT Pub. Date: Oct. 18, 2018

(65) Prior Publication Data
US 2020/0191360 A1     Jun. 18, 2020

(30) Foreign Application Priority Data
Apr. 11, 2017 (JP) .................... 2017-078428

(51) Int. Cl.
F21V 9/14       (2006.01)
H01H 13/02      (2006.01)
H01H 9/16       (2006.01)
F21Y 115/10     (2016.01)

(52) U.S. Cl.
CPC ............. *F21V 9/14* (2013.01); *H01H 9/161* (2013.01); *H01H 13/023* (2013.01); *F21Y 2115/10* (2016.08)

(58) Field of Classification Search
CPC ....... F21V 9/14; F21Y 2115/10; H01H 9/161; H01H 13/023
See application file for complete search history.

(56) References Cited

FOREIGN PATENT DOCUMENTS

| JP | S61-25002 Y2 | 7/1986 |
|----|--------------|--------|
| JP | 62-096905 A  | 5/1987 |
| JP | 63-265203 A  | 11/1988 |

(Continued)

*Primary Examiner* — Joseph L Williams
(74) *Attorney, Agent, or Firm* — Roberts Calderon Safran & Cole P.C.

(57) ABSTRACT

A switch device includes a display device including a polarization plate including a first polarization layer that transmits a linear polarization component oscillating in a first direction, and a second polarization layer that transmits a linear polarization component oscillating in a second direction, the first and second polarization layers being stacked directly on top of one another so that the first direction is orthogonal to the second direction, a first light source unit that outputs the linear polarization component oscillating in the first direction, and a second light source unit that outputs the linear polarization component oscillating in the second direction, a switch section that performs switching between the light emitting state and the non-light emitting state of the first and second light source units, and an operating section that operates the switch section, wherein the polarization plate is provided in the operating section.

5 Claims, 7 Drawing Sheets

(56) References Cited

FOREIGN PATENT DOCUMENTS

| JP | 11-327453 A | 11/1999 |
|---|---|---|
| JP | 2007-072203 A | 3/2007 |
| JP | 2017-173531 A | 9/2017 |

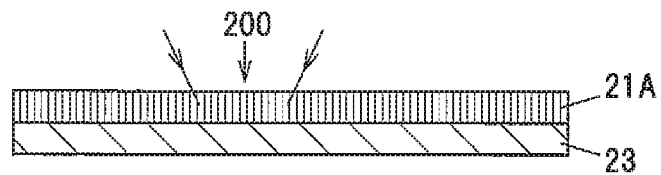
FIG.4A
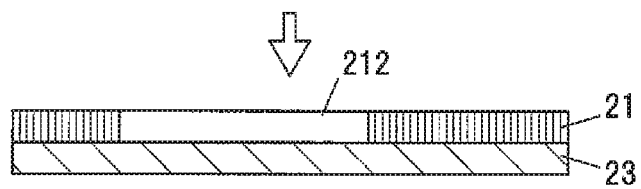
FIG.4B
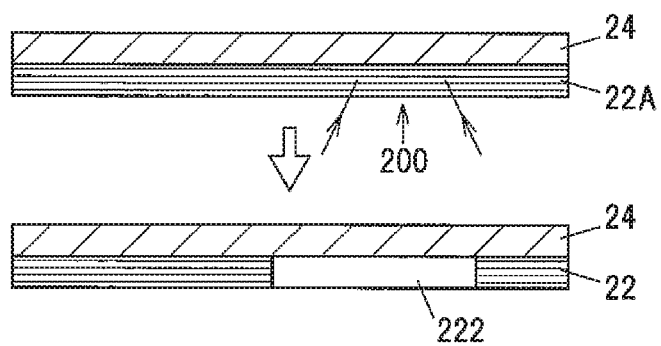
FIG.4C
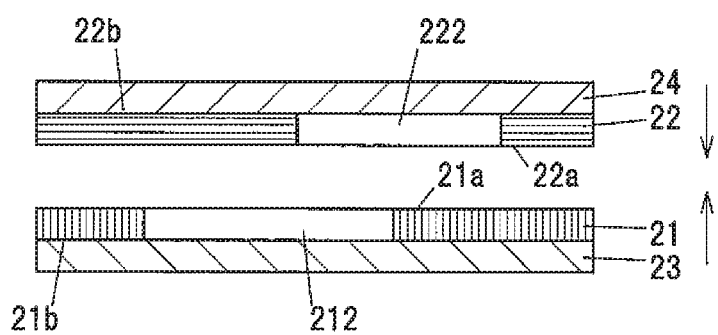
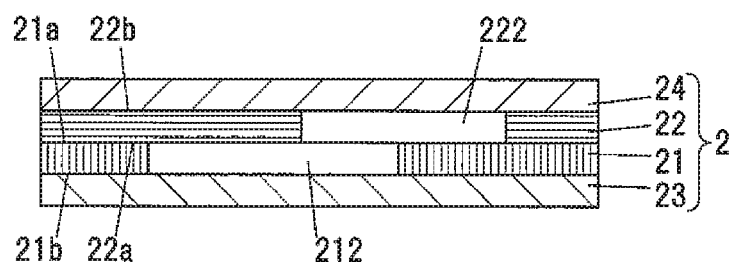

POLARIZATION PLATE, DISPLAY DEVICE, AND SWITCH DEVICE

CROSS-REFERENCE TO RELATED APPLICATIONS

The present application is a U.S. National Phase of PCT/JP2018/013213 filed on Mar. 29, 2018 claiming priority to Japanese Patent Application No. 2017-078428 filed on Apr. 11, 2017. The disclosure of the PCT Application is hereby incorporated by reference into the present Application.

TECHNICAL FIELD

The present invention relates to a polarization plate, a display device and a switch device.

BACKGROUND ART

A display device is known which is provided with two light sources emitting lights with polarization directions different from each other, two polarization plates respectively transmitting the lights with polarization directions from the light sources, and two display polarization plates each of which has a polarization portion with the polarization direction of the light transmitted through each polarization plate and a light transmitting portion formed by cutting out a shape or a character to be displayed, wherein the displayed information is changed by switching light to be emitted (see, e.g., Patent Literature 1).

Since this display device switchably displays different shapes, etc., on the same display surface, the display surface requires only a small space and clear display is obtained with a simpler configuration than the conventional display switching lamp used for the same purpose.

CITATION LIST

Patent Literature

Patent Literature 1: JP 61-025002 Y

SUMMARY OF INVENTION

Technical Problem

In the meantime, the polarization plate is generally protected by protective films since polarizing performance is likely to be impaired by water or heat because of its material properties.

In case of the display device described in Patent Literature 1, polarization properties of the polarized light transmitted through the polarization plate may change due to front- and back-surface reflections at the protective films, resulting in outputting the polarized light with the changed properties.

It is an object of the invention to provide a polarization plate capable of reducing output of polarized light with changed polarization properties, and a display device and a switch device which use such polarization plate.

Solution to Problem

A polarization plate, a display device and a switch device described in [1] to [6] below are provided as an embodiment of the invention.

[1] A polarization plate, comprising: a first polarization layer that transmits a linear polarization component oscillating in a first direction; and a second polarization layer that transmits a linear polarization component oscillating in a second direction, wherein the first polarization layer and the second polarization layer are stacked directly on top of one another so that the first direction is orthogonal to the second direction.

[2] The polarization plate described in [1], wherein the first polarization layer comprises a first protective film on a surface opposite to the surface in contact with the second polarization layer, and the second polarization layer comprises a second protective film on a surface opposite to the surface in contact with the first polarization layer.

[3] A display device, comprising: the polarization plate described in [1] or [2]; a first light source unit that outputs the linear polarization component oscillating in the first direction among light emitted from a light source; and a second light source unit that outputs the linear polarization component oscillating in the second direction among light emitted from a light source, wherein the first polarization layer of the polarization plate comprises a first polarization region transmitting the linear polarization component oscillating in the first direction and not transmitting the linear polarization component oscillating in the second direction and a first display region transmitting both the linear polarization component oscillating in the first direction and the linear polarization component oscillating in the second direction and having the shape of a first display mark section, and the second polarization layer of the polarization plate comprises a second polarization region transmitting the linear polarization component oscillating in the second direction and not transmitting the linear polarization component oscillating in the first direction and a second display region transmitting both the linear polarization component oscillating in the second direction and the linear polarization component oscillating in the first direction and having the shape of a second display mark section.

[4] A switch device, comprising: the display device described in [3], a switch section that performs switching between the light emitting state and the non-light emitting state of the first and second light source; and an operating section that operates the switch section, wherein the display-side polarization plate is provided in the operating section.

[5] The switch device described in [4], wherein the switch section is arranged at an end portion of a cylindrical housing section, and the operating section moves along an axial direction of the housing section to switch the operating state of the switch section.

[6] The switch device described in [5], wherein the operating section extends toward the end portion of the housing section, a pusher separating the first light source unit from the second light source unit is provided, and the operating state of the switch section is switched via the pusher.

Advantageous Effects of Invention

According to an embodiment of the invention, it is possible to provide a polarization plate, a display device and a switch device which reduce output of polarized light with changed polarization properties.

BRIEF DESCRIPTION OF DRAWINGS

FIG. 4A is an explanatory diagram illustrating a process of forming the first polarization layer by shining laser light in a method of manufacturing the display-side polarization plate.

FIG. 4B is an explanatory diagram illustrating a process of forming the second polarization layer by shining laser light in the method of manufacturing the display-side polarization plate.

FIG. 4C is an explanatory diagram illustrating a process of adhering the first polarization layer formed in FIG. 4A to the second polarization layer formed in FIG. 4B in the method of manufacturing the display-side polarization plate.

DESCRIPTION OF EMBODIMENTS

Summary of Embodiments

The switch device in the present embodiment generally comprises a first light source unit that outputs a linear polarization component oscillating in a first direction among light emitted from a light source, a second light source unit that outputs a linear polarization component oscillating in a second direction among light emitted from another light source, a switch section that performs switching between the light emitting state and the non-light emitting state of the first and second light source units, an operating section that operates the switch section, a first polarization layer that transmits the linear polarization component oscillating in the first direction, and a second polarization layer that transmits the linear polarization component oscillating in the second direction, wherein the first polarization layer comprises a first polarization region transmitting the linear polarization component oscillating in the first direction and not transmitting the linear polarization component oscillating in the second direction and a first display region transmitting both the linear polarization component oscillating in the first direction and the linear polarization component oscillating in the second direction and having the shape of a first display mark section, the second polarization layer comprises a second polarization region transmitting the linear polarization component oscillating in the second direction and not transmitting the linear polarization component oscillating in the first direction and a second display region transmitting both the linear polarization component oscillating in the second direction and the linear polarization component oscillating in the first direction and having the shape of a second display mark section, and the first polarization layer and the second polarization layer are stacked directly on top of one another.

In this switch device, the polarization plate has a configuration in which the first polarization layer and the second polarization layer are stacked directly on top of one another. Therefore, unlike the case where a protective film is interposed between the first polarization layer and the second polarization layer, it is possible to reduce change in polarization properties caused by front- and back-surface reflections at the protective films.

Embodiment (General Configuration of the Switch Device 1)

Figure 1A:
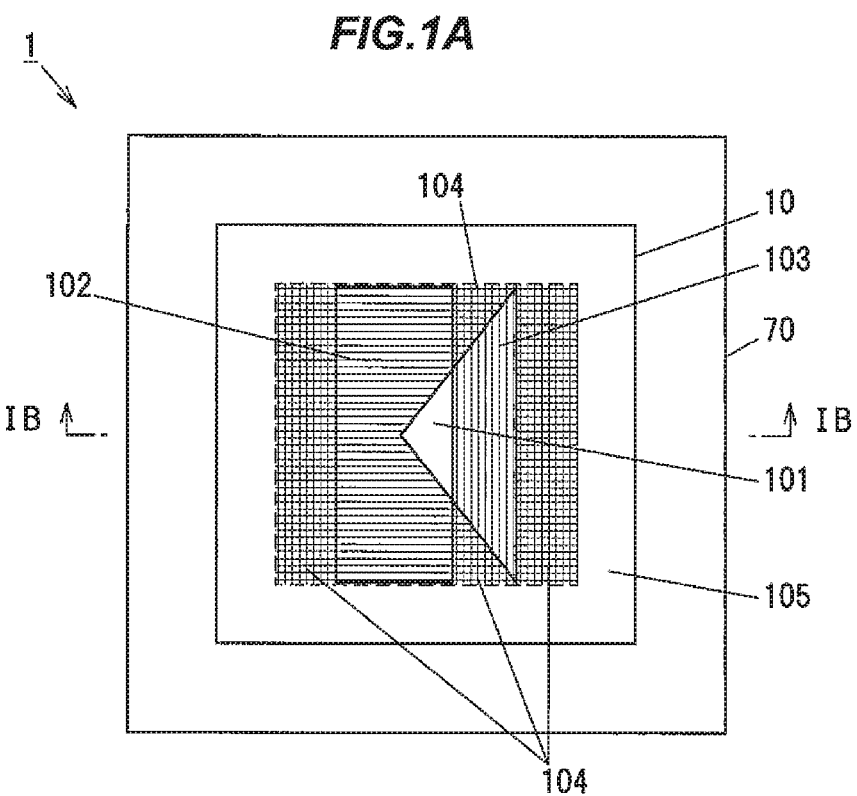
FIG. 1A is a top view showing a switch device in an embodiment of the present invention.
Figure 1B:
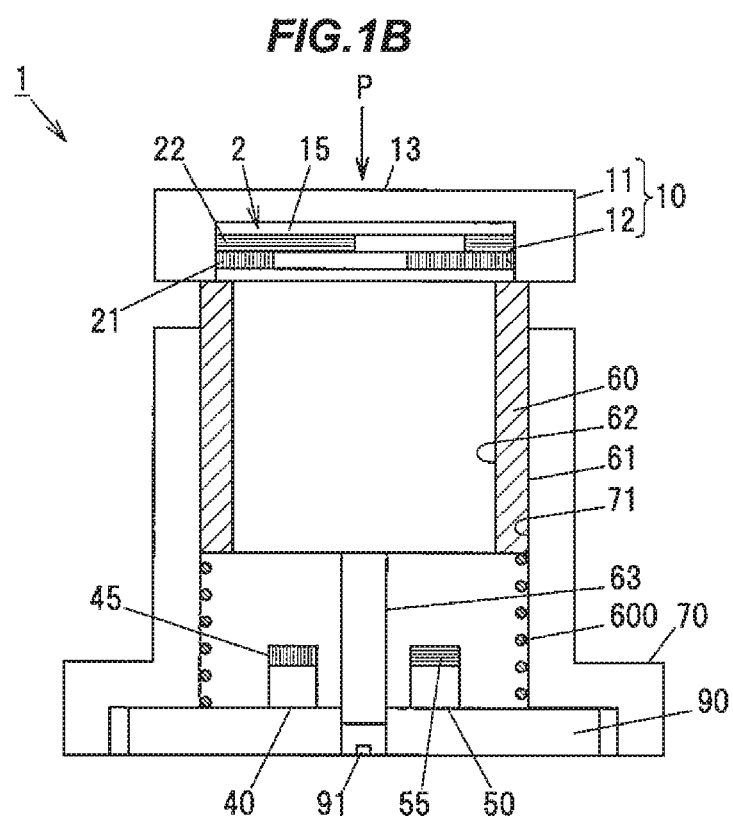
FIG. 1B is a cross sectional view taken along a line IB-IB in FIG. 1A.

As shown in FIGS. 1A and 1B, a switch device 1 in the present embodiment is provided with first and second light sources 40 and 50, a first light source-side polarization plate 45 which transmits a linear polarization component oscillating in the first direction among light emitted from the first light source 40, a second light source-side polarization plate 55 which transmits a linear polarization component oscillating in the second direction among light emitted from the second light source 50, a switch section 91 which performs switching between the light emitting state and the non-light emitting state of the first and second light sources 40 and 50, an operating section 10 which operates the switch section 10, and a display-side polarization plate 2 which has a first polarization layer 21 transmitting the linear polarization component oscillating in the first direction and a second polarization layer 22 transmitting the linear polarization component oscillating in the second direction and serves as a polarization plate for displaying a first display mark section 215 and a second display mark section 225. The first light source 40 and the first light source-side polarization plate 45 correspond to "the first light source unit" of the invention, and the second light source 50 and the second light source-side polarization plate 55 correspond to "the second light source unit" of the invention.

In one aspect of the invention, the first and second light sources 40, 50, the first and second light source-side polarization plates 45, 55 and the display-side polarization plate 2 described above constitute the display device.

(Configuration of the Operating Section 10)

As shown in FIGS. 1A and 1B, the operating section 10 is provided with a knob 11 on which push operation is performed, a diffusion plate 15 attached to the knob 11, and a housing section 12 which is a recess for accommodating the display-side polarization plate 2. The knob 11 is formed of, e.g., a resin and is smoke-tinted.

When viewed from the side where operation (push operation) is performed, an operating surface 13 of the operating section 10 serves as an operation surface for the push operation and also serves as a display surface for presenting or displaying information about the switch, etc. In the following description, the operating surface 13 as a display surface will be described.

As shown in FIG. 1A, the operating surface 13 has a display region which is divided into several areas and on which a graphic symbol such as mark or character is presented or displayed. In the following description, display of the graphic symbol such as mark or character will be described as one form of presentation of the graphic symbol such as mark or character.

The graphic symbol such as mark or character displayed on the operating surface 13 is produced by a combination of polarization regions and display regions formed on the display-side polarization plate 2 (described later) and is displayed based on switching control between light emission from the first light source 40 and light emission from the second light source 50. The display here is produced through the diffusion plate 15 mentioned above and is thus illuminated with uniform light, but the diffusion plate 15 may not be provided. Meanwhile, the knob 11 is smoke-tinted and is thus dark when the display is not illuminated by the first light source 40, etc.

As shown in FIG. 1A, a common section 101 is a region transmitting light from both the first light source 40 and the second light source 50 to produce display, i.e., a presentation section in which the polarization direction in each polarization region (described later) is removed to show information to be presented. The common section 101 is a region of the display-side polarization plate 2 in which the first polarization layer 21 and the second polarization layer 22 (described later) are provided so as to partially overlap, and it is a region commonly used to produce display by light emitted from the first light source 40 and display by light emitted from the second light source 50.

A first region 102 is a region which transmits only light from the first light source 40 and does not transmit light from the second light source 50, and is a horizontally-hatched area in FIG. 1A. Meanwhile, a second region 103 is a region which transmits only light from the second light source 50 and does not transmit light from the first light source 40, and is a vertically-hatched area in FIG. 1A. Then, a non-display region 104 is a region which does not transmit light from any of the first light source 40 and the second light source 50, and is an area with vertical and horizontal cross-hatch lines in FIG. 1A. A frame section 105 on the further outer side is also a non-display region.

A graphic symbol such as predetermined mark or character formed by combining the common section 101, the first region 102, the second region 103 and the non-display region 104 described above is displayed on the operating surface 13. Transmittance and opacity of light here only need to be enough to display the graphic symbol such as predetermined mark or character, and transmittance and opacity do not need to be 100%. In addition, the non-display region 104 may alternatively be an opaque region formed on the corresponding regions of the first polarization layer 21 and the second polarization layer 22 of the display-side polarization plate 2 by, e.g., applying a black coating, etc.

As shown in FIG. 1B, the operating section 10 has a switching mechanism which can be push-operated in a P-direction. A lower portion of the operating section 10 is fixed to a holder 60. The operating section 10 and the holder 60 can integrally move in a vertical direction.

The holder 60 is formed in a cylindrical shape. An outer peripheral portion 61 of the holder 60 is slidably fitted to an inner peripheral portion 71 of a cylindrical case 70. The holder 60 is provided with a pusher 63 which extends from the lower portion thereof toward a substrate 90. The pusher 63 is arranged between the first light source 40 and the second light source 50 in the case 70 and separates the first light source 40 from the second light source 50. Thus, the pusher 63 prevents light output from one of the first and second light sources 40 and 50 from leaking to the other light source side.

The holder 60 is vertically supported by an elastic force of a spring 600 which is arranged between the holder 60 and the substrate 90 fixed to the bottom surface of the case 70. In this configuration, the pusher 63 of the holder 60 when push-operated in the P-direction activates the switch section 91 mounted on the substrate 90. In this configuration, since the switch section 91 is arranged at an end portion of the cylindrical case, an operating state (ON or OFF state) of the switch section 91 is switched by moving the operating section 10 along an axial direction of the case 70. As such, the configuration having the operating section 10 and the case 70, etc., shown in FIGS. 1A and 1B functions as a switch device, particularly, as a switch device provided with an operating section capable of switching the display.

(Configuration of the First Light Source 40)

The first light source 40 emits, e.g., laser light, or LED light, etc. In case of, e.g., laser light, the polarization direction is adjusted so that light has a polarization component in a specific direction. In case of LED light, etc., a polarizing element is arranged at a light output portion so that light has a polarization component in a specific direction. In the present embodiment, an LED light source is used as the first light source 40 and the first light source-side polarization plate 45 is arranged at the light output portion.

The first light source 40 outputs light having a linear polarization component oscillating in the first direction since the first light source-side polarization plate 45 is provided thereon. The first light source-side polarization plate 45 is a polarization plate with a polarizing function of transmitting only the linear polarization component oscillating in the first direction among light from the first light source 40.

(Configuration of the Second Light Source 50)

The second light source 50 emits, e.g., laser light, or LED light, etc. In case of, e.g., laser light, the polarization direction is adjusted so that light has a polarization component in a specific direction. In case of LED light, etc., a polarizing element is arranged at a light output portion so that light has a polarization component in a specific direction. In the present embodiment, an LED light source is used as the second light source 50 and the second light source-side polarization plate 55 is arranged at the light output portion.

The second light source 50 outputs light having a linear polarization component oscillating in the second direction since the second light source-side polarization plate 55 is provided thereon. The second light source-side polarization plate 55 is a polarization plate with a polarizing function of transmitting only the linear polarization component oscillating in the second direction among light from the second light source 50. Therefore, the polarization direction of light output from the second light source 50 through the second light source-side polarization plate 55 is orthogonal to the polarization direction of light output from the first light source 40 through the first light source-side polarization plate 45.

The vertical lines in the first light source-side polarization plate 45 and the first polarization layer 21 shown in each drawing indicate that only the linear polarization component oscillating in the first direction is transmitted. Likewise, the horizontal lines in the second light source-side polarization plate 55 and the second polarization layer 22 indicate that only the linear polarization component oscillating in the second direction is transmitted.

(Configuration of the Display-Side Polarization Plate 2)

Figure 2:
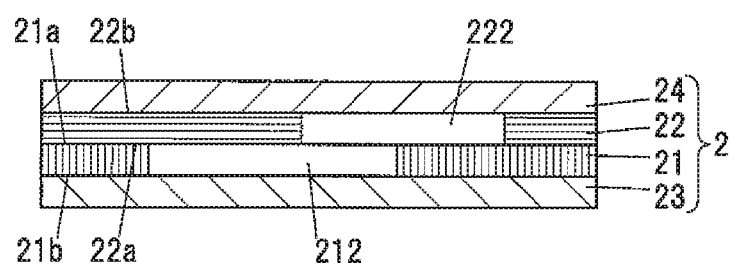
FIG. 2 is a cross sectional view showing a configuration of a display-side polarization plate.

As shown in FIG. 2, the display-side polarization plate 2 is formed in a plate shape and has the first polarization layer 21 and the second polarization layer 22 mentioned previously, and first and second protective films 23 and 24 which sandwich the first polarization layer 21 and the second polarization layer 22 to protect the first polarization layer 21 and the second polarization layer 22.

Each of the first polarization layer 21 and the second polarization layer 22 is constructed from, e.g., a PVA (polyvinyl alcohol) layer formed of a thick PVA film in which contains iodine pigments absorbed thereto and is cross-linked with boric acid. To develop polarization characteristics of the PVA layer, the iodine pigments are oriented by stretching the thick PVA film after being dried and stabilized. The first polarization layer 21 and the second polarization layer 22 are not limited to the PVA layer and may be formed as a wire grid of which polarizing elements are wires formed of a metal such as aluminum and arranged on a resin substrate (e.g., TAC layer) at a predetermined pitch. In addition, absorbed to the PVA film is not limited to the iodine pigments and may be a colorant.

The iodine pigments in the first polarization layer 21 are oriented in a direction orthogonal to the first direction. Light having a polarization component parallel to such orientation direction (the direction orthogonal to the first direction) is reflected or absorbed and does not transmit through the first polarization layer 21. On the other hand, light having a polarization component perpendicular to the orientation direction transmits through the first polarization layer 21.

Likewise, the iodine pigments in the second polarization layer 22 are oriented in a direction orthogonal to the second direction. Light having a polarization component parallel to such orientation direction (the direction orthogonal to the second direction) is reflected or absorbed and does not transmit through the second polarization layer 22. On the other hand, light having a polarization component perpendicular to the orientation direction transmits through the second polarization layer 22.

The first polarization layer 21 and the second polarization layer 22 described above are generally protected by the first and second protective films 23 and 24 as described below since polarizing performance thereof is impaired by water or heat because of its material properties.

The first protective film 23 and the second protective film 24 are formed of, e.g., TAC (cellulose triacetate), COP (cycloolefin polymer), polycarbonate or acrylic which are protective film materials with excellent optical properties.

The first protective film 23 is adhered to one surface 21b which is one of upper and lower surfaces of the first polarization layer 21 and faces toward the first and second light sources 40 and 50. The first protective film 23 is adhered by using, e.g., a known gluing agent or adhesive agent such as hydrophilic glue, ultraviolet cure adhesive or thermosetting adhesive. However, the type of gluing agent or adhesive agent and the adhering method are not limited thereto.

The second protective film 24 is adhered to another surface 22b which is one of the upper and lower surfaces of the second polarization layer 22 and is opposite to one surface 22a facing toward the first and second light sources 40 and 50. The method for adhering the second protective film 24 is the same as the method for adhering the first protective film 23 mentioned above.

The display-side polarization plate 2 in the present embodiment is configured so that the first polarization layer 21 and the second polarization layer 22 are stacked directly on top of one another. In other words, the first polarization layer 21 and the second polarization layer 22 are laminated so that another surface 21a of the first polarization layer 21 is directly in contact with the one surface 22a of the second polarization layer 22.

(Configuration of the First Polarization Layer 21)

Figure 3A:
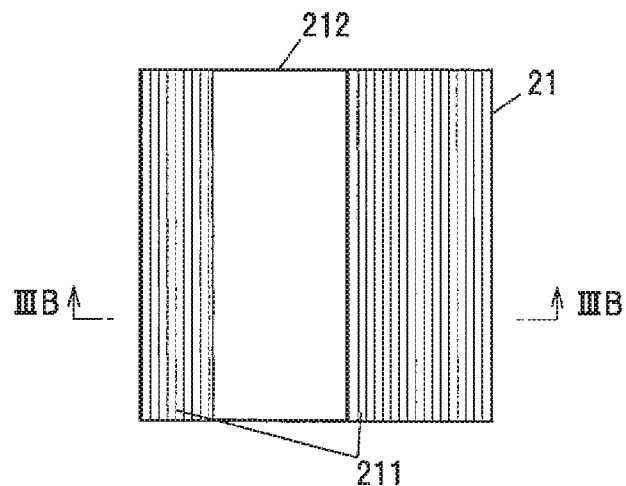
FIG. 3A is a top view showing a first polarization layer.
Figure 3B:
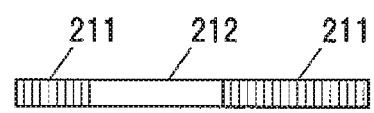
FIG. 3B is a cross sectional view taken along a line IIIB-IIIB in FIG. 3A.

As shown in FIGS. 3A and 3B, the first polarization layer 21 is formed in a plate shape. The first polarization layer 21 has the following regions: a first polarization region 211 transmitting the linear polarization component oscillating in the first direction and not transmitting the linear polarization component oscillating in the second direction, and a first display region 212 transmitting both the linear polarization component oscillating in the first direction and the linear polarization component oscillating in the second direction and having the shape of the first display mark section 215. Thus, light output from the first light source 40 through the first light source-side polarization plate 45 can transmit though the entire region of the first polarization layer 21, and light output from the second light source 50 through the second light source-side polarization plate 55 can transmit only through the first display region 211 of the first polarization layer 21. The shapes of the first polarization region 211 and the first display region 212 allow the graphic symbol such as predetermined mark or character to be displayed by combining with the second polarization layer 22 (described later).

Here, the first display region 212 of the first polarization layer 21 shown in FIG. 3A is a region in which the iodine pigments or colorant in the PVA layer is sublimed and disappear by exposure to laser radiation, etc. As a result, the first display region 212 does not have a polarizing function and can transmit light regardless of the polarization state.

(Configuration of the Second Polarization Layer 22)

The second polarization layer 22 is configured in the same manner as the first polarization layer 21 and is also formed in a plate shape. The second polarization layer 22 partially overlaps the first polarization layer 21 in the operating section 10.

Figure 3C:
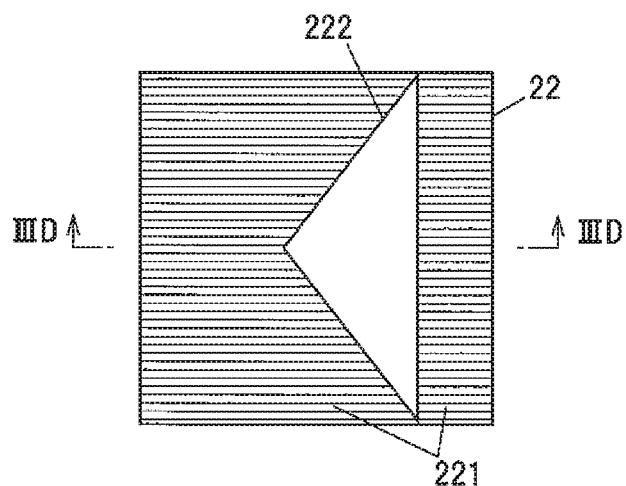
FIG. 3C is a top view showing a second polarization layer.
Figure 3D:
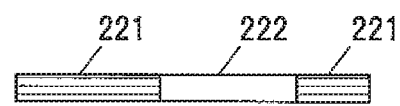
FIG. 3D is a cross sectional view taken along a line IIID-IIID in FIG. 3C.

As shown in FIGS. 3C and 3D, the second polarization layer 22 has the following regions: a second polarization region 221 transmitting the linear polarization component oscillating in the second direction and not transmitting the linear polarization component oscillating in the first direction, and a second display region 222 transmitting both the linear polarization component oscillating in the second direction and the linear polarization component oscillating in the first direction and having the shape of the second display mark section 225. Thus, light output from the first light source 40 through the first light source-side polarization plate 45 can transmit only through the second display region 222 of the second polarization layer 22, and light output from the second light source 50 through the second light source-side polarization plate 55 can transmit though the entire region of the second polarization layer 22. The shapes of the second polarization region 221 and the second display region 222 allow the graphic symbol such as predetermined mark or character to be displayed by combining with the first polarization layer 21 described above.

(Method for Manufacturing the Display-Side Polarization Plate 2)

Next, an example of the method for manufacturing the display-side polarization plate 2 in the present embodiment will be described in reference to FIG. 4.

To make the first polarization layer 21, the first protective film 23 is adhered to a PVA layer 21A for the first polarization layer which contains pigments, etc., absorbed to polymer chains and has a polarizing function of reflecting or absorbing light polarized in the orientation direction of the pigments, etc., as shown in the upper drawing of FIG. 4A.

Figure 5A:
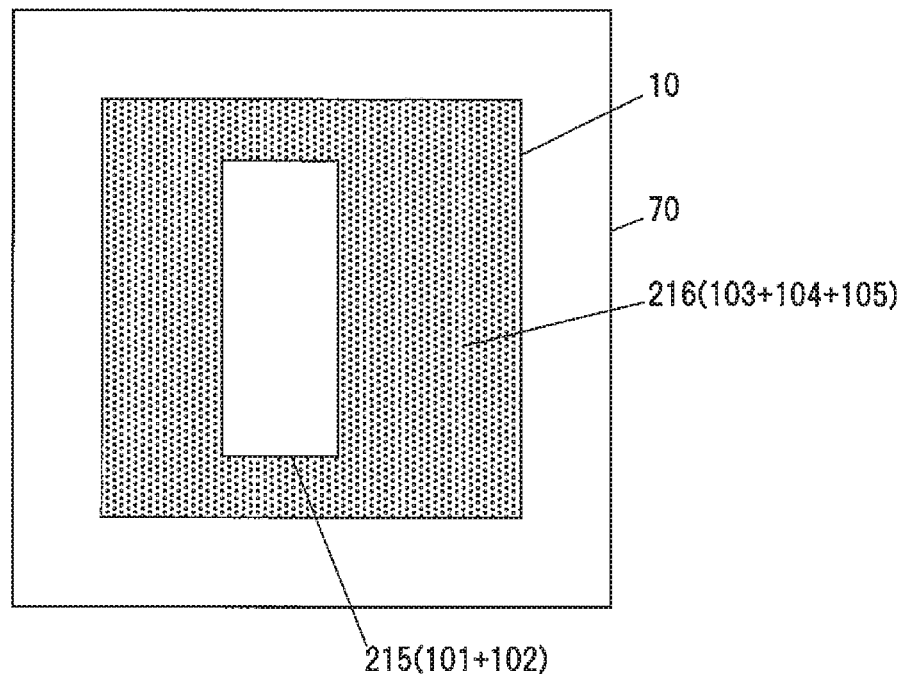
FIG. 5A is a top view showing a state in which a second display mark is displayed when a first light source emits light.

Then, as shown in the lower drawing of FIG. 4A, laser light 200 is shone onto a predetermined region of the PVA layer 21A for the first polarization layer which is the polarization layer, e.g., onto the common section 101 and the first region 102 of the first display mark section 215 shown in FIG. 5A. By exposure to the laser light 200, iodine pigments or colorant in the exposed region are removed due to sublimation, etc. The polarizing function of the exposed region thus disappears and the PVA layer 21A for the first polarization layer is formed into the first polarization layer 21. Alternatively, a method in which the first protective film 23 (e.g., a TAC layer) is adhered after shining the laser light 200 directly on a predetermined region of the PVA layer 21A for the first polarization layer may be used instead of the method shown in FIG. 4A. The laser light 200 here is linearly polarized light or elliptically polarized light.

To make the second polarization layer 22, the second protective film 24 is adhered to a PVA layer 22A for the second polarization layer which contains pigments, etc., absorbed to polymer chains and has a polarizing function of reflecting or absorbing light polarized in the orientation direction of the pigments, etc., in the same manner as when making the first polarization layer 21, as shown in the upper drawing of FIG. 4B.

Figure 6A:
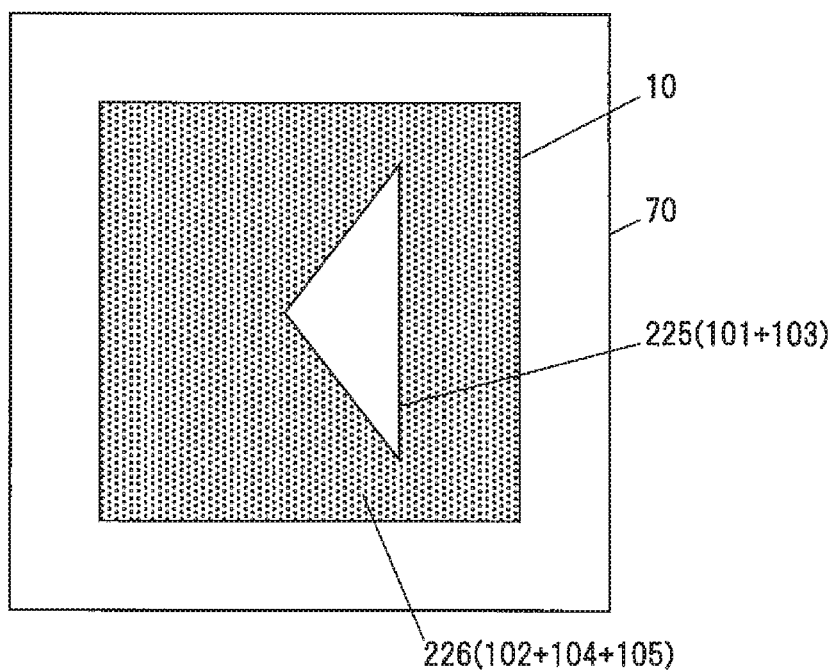
FIG. 6A is a top view showing a state in which a first display mark section is displayed when a second light source emits light.

Then, as shown in the lower drawing of FIG. 4B, the laser light 200 is shone onto a predetermined region of the PVA layer 22A for the second polarization layer which is the polarization layer, e.g., onto the common section 101 and the second region 103 of the second display mark section 225 shown in FIG. 6A. By exposure to the laser light 200, iodine pigments or colorant in the exposed region are removed due to sublimation, etc. The polarizing function of the exposed region thus disappears and the PVA layer 22A for the second polarization layer is formed into the second polarization layer 22. Alternatively, a method in which the second protective film 24 (e.g., a TAC layer) is adhered after shining the laser light 200 directly on a predetermined region of the PVA layer 22A for the second polarization layer may be used instead of the method shown in FIG. 4B, in the same manner as when making the first polarization layer 21.

Lastly, the other surface 21a and the one surface 22a are brought close together as shown in the upper drawing of FIG. 4C, and the first polarization layer 21 is adhered to the second polarization layer 22. The display-side polarization plate 2 in the present embodiment is thereby obtained. However, the procedure for manufacturing the display-side polarization plate 2 is not limited thereto. For example, after adhering the first polarization layer 21 to the second polarization layer 22, the first and second protective films 23 and 24 may be respectively adhered to the first and second polarization layers 21 and 22.

(Operation)
(Displaying the First Display Mark Section 215)

Figure 5B:
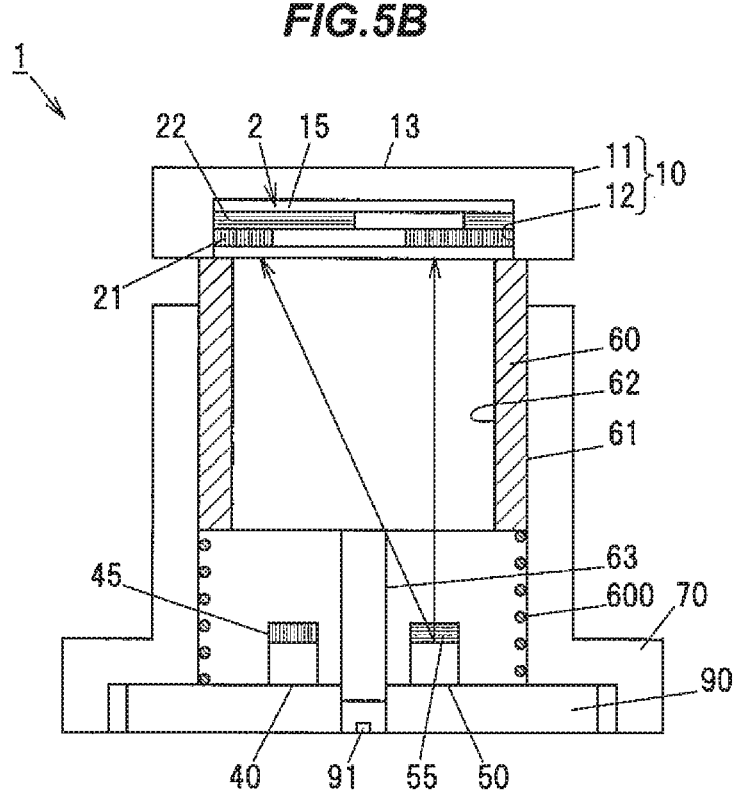
FIG. 5B is an explanatory diagram illustrating a path of light emitted from the first light source.

When light is emitted from the second light source 50 by operating the operating section 10, light having a linear polarization component oscillating in the second direction is output from the second light source 50 through the second light source-side polarization plate 55 and transmits through the first display region 212 of the first polarization layer 21 and the entire region of the second polarization layer 22, as shown in FIG. 5B. As a result, the second display mark section 225 formed by combining the common section 101 with the first region 102 shown in FIG. 1A is displayed as shown in FIG. 5A. The region other than the first display mark section 215 is a first non-mark display portion 216 formed by combining the second region 103, the non-display region 104 and the frame section 105 shown in FIG. 1A and does not produce display, i.e., dark.

(Displaying the Second Display Mark Section 225)

Figure 6B:
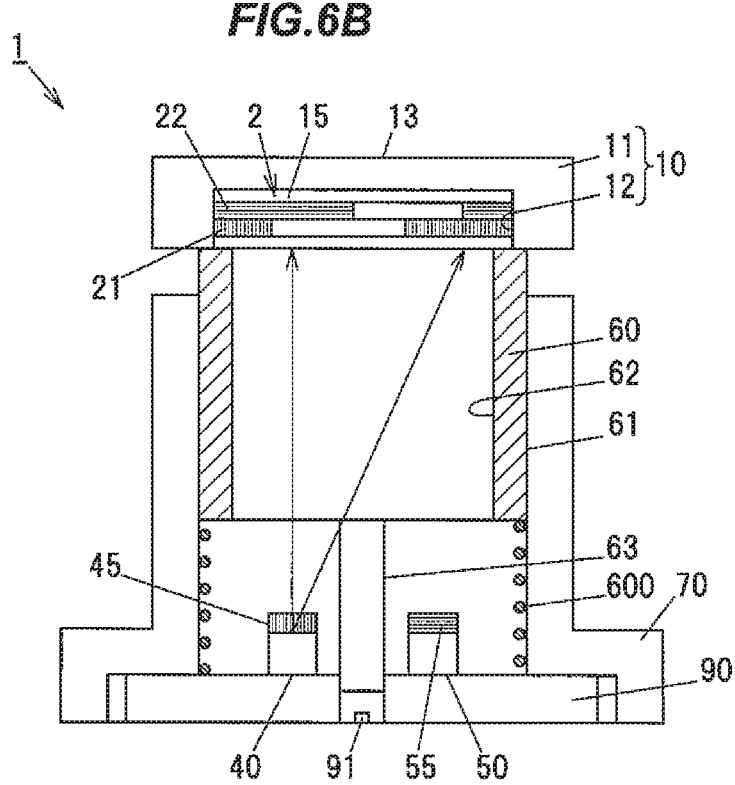
FIG. 6B is an explanatory diagram illustrating a path of light emitted from the second light source.

When light is emitted from the first light source 40 by operating the operating section 10, light having a linear polarization component oscillating in the first direction is output from the first light source 40 through the first light source-side polarization plate 45 and transmits through the entire region of the first polarization layer 21 and the second display region 222 of the second polarization layer 22 of the display-side polarization plate 2, as shown in FIG. 6B. As a result, the second display mark section 225 formed by combining the common section 101 with the second region 103 shown in FIG. 1A is displayed as shown in FIG. 6A. The region other than the second display mark section 225 is a second non-mark display portion 226 formed by combining the first region 102, the non-display region 104 and the frame section 105 shown in FIG. 1A and does not produce display, i.e., dark.

Figure 7A:
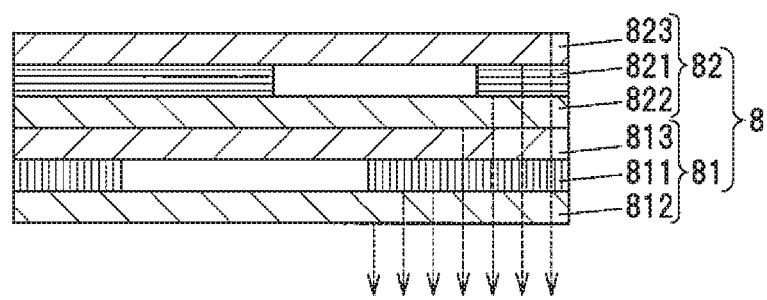
FIG. 7A is a cross sectional view showing a cross-sectional structure of a conventional display-side polarization plate, together with reflection components.

Next, the effect of the display-side polarization plate 2 in the present embodiment will be described in reference to FIG. 7. In the following description, the display-side polarization plate 2 in the present embodiment will be compared with a display-side polarization plate 8 in Comparative Example shown in FIG. 7A. In FIG. 7, constituent elements having the same functions as those described for the display-side polarization plate 2 in the present embodiment are denoted by the same or corresponding reference numerals or names and the explanation thereof will be omitted.

The display-side polarization plate 8 in Comparative Example has a first display-side polarization plate 81 having the first display mark section 215 formed thereon and a second display-side polarization plate 82 having the second display mark section 225 formed thereon.

The first display-side polarization plate 81 has a first polarization layer 811 having a polarizing function, and first and second protective films 812 and 813 which protect the upper and lower sides of the first polarization layer 811. The first polarization layer 811 is sandwiched between the first and second protective films 812 and 813.

The first protective film 812 is adhered to a surface of the first polarization layer 811 which faces toward the first and second light source-side polarization plates 45 and 55, while the second protective film 813 is adhered to a surface of the first polarization layer 811 which faces toward the operating surface 13.

The second display-side polarization plate 82 has a second polarization layer 821 having a polarizing function, and third and fourth protective films 822 and 823 which protect the upper and lower sides of the second polarization layer 821. The second polarization layer 821 is sandwiched between the third and fourth protective films 822 and 823.

The third protective film 822 is adhered to a surface of the second polarization layer 821 which faces toward the first and second light source-side polarization plates 45 and 55, while the fourth protective film 823 is adhered to a surface of the second polarization layer 821 which faces toward the operating surface 13. The second protective film 813 of the first display-side polarization plate 81 and the third protective film 822 of the second display-side polarization plate 82 are directly adhered and laminated.

In the display-side polarization plate 8 of Comparative Example configured as such, a portion of polarized light emitted from the first and second light source-side polarization plates 45 and 55 is reflected at the front and back surfaces of each protective film, as shown in FIG. 7A. In FIG. 7, reflection components reflected at the front and back surfaces are indicated by dashed arrows.

In more detail, a portion of the polarized light emitted from the first and second light source-side polarization plates 45 and 55 is reflected at one surface of the first protective film 812 facing the first polarization layer 811 and at the other surface opposite thereto and travels toward the first and second light source-side polarization plates 45 and 55. The same applies to the second protective film 813, the third protective film 822 and the fourth protective film 823.

Figure 7B:
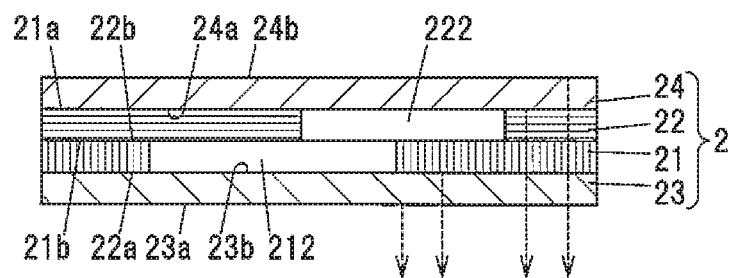
FIG. 7B is a cross sectional view showing a cross-sectional structure of the display-side polarization plate in the present embodiment, together with reflection components.

In contrast, in the present embodiment, a portion of the polarized light from the first and second light source-side polarization plates 45 and 55 is reflected at one surface 23a of the first protective film 23 facing toward the first and second light source-side polarization plates 45 and 55, another surface 23b opposite to the one surface 23a, one surface 24a of the second protective film 24 facing toward the first and second light source-side polarization plates 45 and 55, and another surface 24b, as shown in FIG. 7B.

Since the display-side polarization plate 2 in the present embodiment is configured that the first polarization layer 21 and the second polarization layer 22 are stacked directly on top of one another without any protective film interposed therebetween, reflection components are reduced as compared to the display-side polarization plate 8 in Comparative Example. It is thereby possible to reduce change in polarization properties of the polarized light transmitted through the display-side polarization plate 2.

Effects of the Embodiment

Since the switch device 1 in the present embodiment is provided with the display-side polarization plate 2 in which the first polarization layer 21 transmitting the linear polarization component oscillating in the first direction and the second polarization layer 22 transmitting the linear polarization component oscillating in the second direction orthogonal to the first direction are stacked directly on top of one another, it is possible to reduce change in polarization properties which is caused by front and back surface reflection when the polarized light emitted from the first and second light source-side polarization plates 45 and 55 transmits through the display-side polarization plate 2. As a result, leakage of light from the first and second non-mark display portions 216 and 226 can be prevented and it is thereby possible to improve display performance.

The switch device 1 in the present embodiment can switchably display the display mark sections on the operating surface 13 of the knob 11, and thus can switch, e.g., the display contents according to the ON/OFF operation of the switch device. In addition, since the switchable display of the contents are high-quality display provided by improving visual performance of the non-mark display portions, operability at the time of performing switching operation on the switch device 1 is improved.

The present embodiment is applicable to a switch device with a display switching function as well as a display switching device without switch function.

Although some embodiments and modifications of the invention have been described above, the embodiments and modifications are merely an example and the invention according to claims is not to be limited thereto. These new embodiments and modifications may be implemented in various other forms, and various omissions, substitutions and changes, etc., can be made without departing from the gist of the invention. In addition, all combinations of the features described in the embodiments and modifications are not necessary to solve the problem of the invention. Further, these embodiments and modifications are included within the scope and gist of the invention and also within the invention described in the claims and the equivalency thereof.

REFERENCE SIGNS LIST

1 SWITCH DEVICE
2, 8 DISPLAY-SIDE POLARIZATION PLATE
10 OPERATING SECTION
21 FIRST POLARIZATION LAYER
22 SECOND POLARIZATION LAYER
23 FIRST PROTECTIVE FILM
24 SECOND PROTECTIVE FILM
40 FIRST LIGHT SOURCE
45 FIRST LIGHT SOURCE-SIDE POLARIZATION PLATE
50 SECOND LIGHT SOURCE
55 SECOND LIGHT SOURCE-SIDE POLARIZATION PLATE
91 SWITCH SECTION
211 FIRST POLARIZATION REGION
212 FIRST DISPLAY REGION
215 FIRST DISPLAY MARK SECTION
221 SECOND POLARIZATION REGION
222 SECOND DISPLAY REGION
225 SECOND DISPLAY MARK SECTION

The invention claimed is:

1. A display device, comprising:
a polarization plate comprising a first polarization layer that transmits a linear polarization component oscillating in a first direction, and a second polarization layer that transmits a linear polarization component oscillating in a second direction;
a first light source unit that outputs the linear polarization component oscillating in the first direction among light emitted from a light source; and
a second light source unit that outputs the linear polarization component oscillating in the second direction among light emitted from a light source,
wherein the first polarization layer and the second polarization layer are stacked directly on top of one another so that the first direction is orthogonal to the second direction,
wherein the first polarization layer of the polarization plate comprises a first polarization region transmitting the linear polarization component oscillating in the first direction and not transmitting the linear polarization component oscillating in the second direction and a first display region transmitting both the linear polarization component oscillating in the first direction and the linear polarization component oscillating in the second direction and having the shape of a first display mark section, and the second polarization layer of the polarization plate comprises a second polarization region transmitting the linear polarization component oscillating in the second direction and not transmitting the linear polarization component oscillating in the first direction and a second display region transmitting both the linear polarization component oscillating in the second direction and the linear polarization component oscillating in the first direction and having the shape of a second display mark section.

2. A switch device, comprising:
the display device according to claim 1;

a switch section that performs switching between the light emitting state and the non-light emitting state of the first and second light source units; and an operating section that operates the switch section, wherein the polarization plate is provided in the operating section.

3. The switch device according to claim 2, wherein the switch section is arranged at an end portion of a cylindrical housing section, and the operating section moves along an axial direction of the housing section to switch the operating state of the switch section.

4. The switch device according to claim 3, wherein the operating section extends toward the end portion of the housing section, a pusher separating the first light source unit from the second light source unit is provided, and the operating state of the switch section is switched via the pusher.

5. A display device, comprising:

a polarization plate comprising a first polarization layer that transmits a linear polarization component oscillating in a first direction, and a second polarization layer that transmits a linear polarization component oscillating in a second direction;

a first light source unit that outputs the linear polarization component oscillating in the first direction among light emitted from a light source; and a second light source unit that outputs the linear polarization component oscillating in the second direction among light emitted from another light source, wherein the first polarization layer and the second polarization layer are stacked directly on top of one another so that the first direction is orthogonal to the second direction, wherein the first polarization layer comprises a first protective film on a surface opposite to the surface in contact with the second polarization layer, and the second polarization layer comprises a second protective film on a surface opposite to the surface in contact with the first polarization layer, wherein the first polarization layer of the polarization plate comprises a first polarization region transmitting the linear polarization component oscillating in the first direction and not transmitting the linear polarization component oscillating in the second direction and a first display region transmitting both the linear polarization component oscillating in the first direction and the linear polarization component oscillating in the second direction and having the shape of a first display mark section, and the second polarization layer of the polarization plate comprises a second polarization region transmitting the linear polarization component oscillating in the second direction and not transmitting the linear polarization component oscillating in the first direction and a second display region transmitting both the linear polarization component oscillating in the second direction and the linear polarization component oscillating in the first direction and having the shape of a second display mark section.

* * * * *